United States Patent Office 3,552,188
Patented Jan. 5, 1971

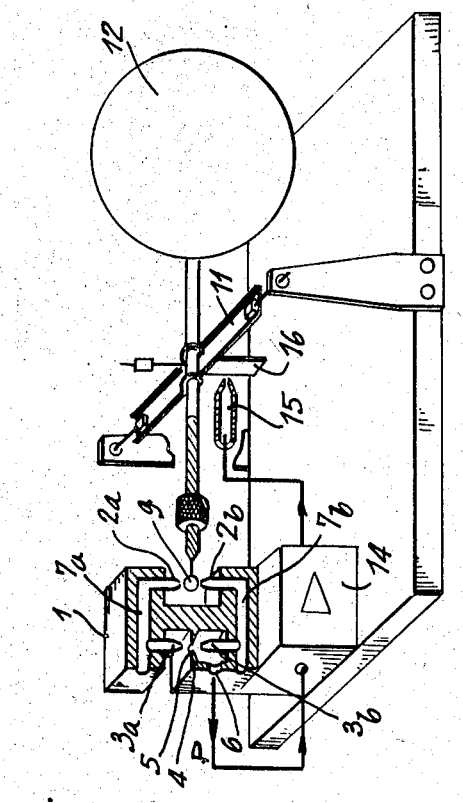
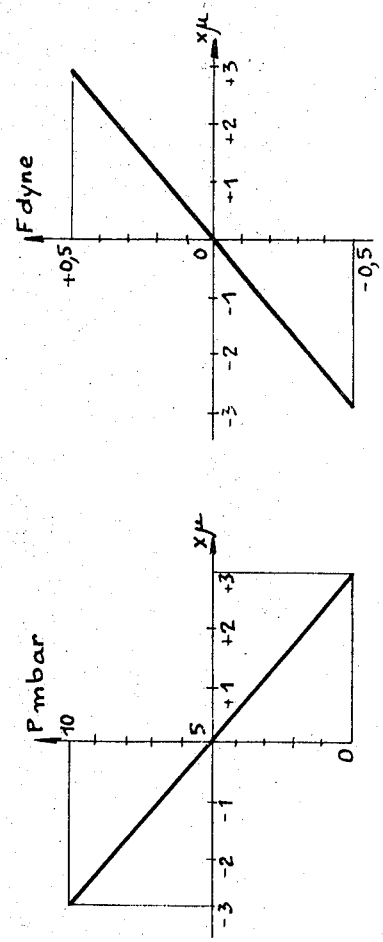
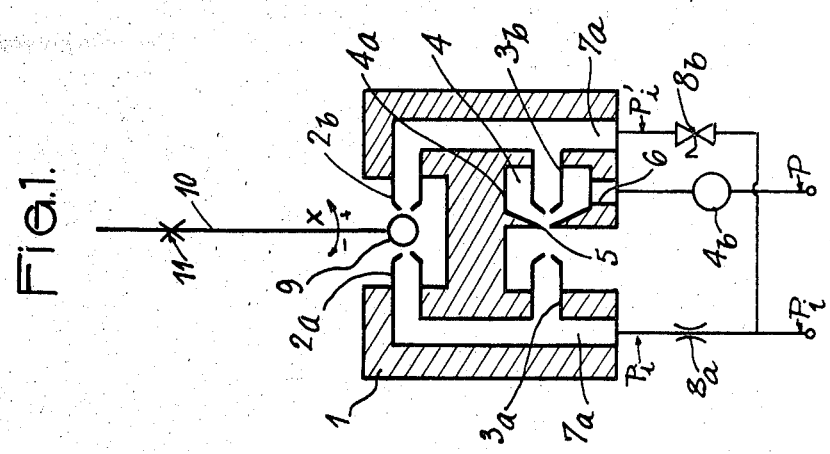

3,552,188
PNEUMATIC GAP DETECTOR FOR A FORCE MICROMETER BALANCE AND SIMILAR DEVICES
Jean-Noel Gaston Andre Rolland, Montrogue, France, assignor to Compagnie des Compteurs, Paris, France, a company of France.
Filed Sept. 25, 1969, Ser. No. 860,934
Claims priority, application France, Sept. 27, 1968, 167,868
Int. Cl. G01b 13/12
U.S. Cl. 73—37.5　　　　　　　　　　　　　　2 Claims

ABSTRACT OF THE DISCLOSURE

A pneumatic gap detector for a force micrometer balance and similar devices has a ball fixed to a member whose position gap is to be detected. The gap detector has a first and second pair of nozzles with the ball being placed between the first pair of nozzles. The detector also has a pressure chamber surrounding one of the second pair of nozzles forming a pneumatic differential amplifier. A pressure detector is connected to the pressure chamber of the amplifier to detect the position gap.

---

The present invention relates to slight interaction pneumatic gap detectors, more particularly detectors for use in combination with pneumatic force micrometer balances, the expression "micrometer balance" designating various pickups used for measuring forces of very slight magnitude (generally less than $10^{-2}$ Newton) by the conventional method called "of zero."

The invention particularly has the object of producing a gap detector or a very sensitive micrometer balance, and possessing a characteristic curve with a very good linearity, so that this gap detector is particularly adapted to the producing of pneumatic servo-balances while converting forces or displacements in proportional pressures, until a zero information is obtained.

It is known that the producing in pneumatic technique of such detectors has, up till now, encountered serious difficulties, seeing that known position gap detecting devices are of the nozzle-vane type, and introduce, with regard to the value of the force to be measured, a considerable parasitic force on the vane.

The invention especially seeks to obviate such disadvantage.

It essentially consists of producing a bridge differential mounting comprising two detection nozzles and two other nozzles, forming a differential pneumatic amplifier by which one balances the quantities of movement produced by two jets coming from the two first nozzles.

It has more precisely the object of a slight interaction pneumatic gap detector particularly for force micrometer balance comprising two first nozzles facing each other, a ball fixed to a member whose position gap is to be detected, this ball being placed between said two first nozzles, two second nozzles facing each other, a casing delimiting a pressure chamber surrounding the one of said second nozzles and forming a pneumatic differential amplifier, the first and second nozzles being mounted in pairs, like a two-branched bridge and being fed by a same fluid source, a pressure regulator being placed between said source and that of said branches which comprises the nozzle of the amplifier, and a capillary restrictive member being placed between said source and the other branch of the bridge, and pressure detecting means being connected to the pressure chamber of the amplifier by which the position gap is detected.

Various other characteristics of the invention will moreover be revealed by the detailed description which follows.

Embodiments of the invention are shown by way of non-restrictive examples of the accompanying drawing.

FIG. 1 is a diagrammatical sectional view of a position gap detector forming a force micrometer balance.

FIGS. 2 and 3 are characteristic operational curves.

FIG. 4 is a partially cut-away perspective of a force balance comprising the gap detector of FIG. 1.

In FIGS. 1 and 4, we see the body 1 of the gap detector in which opposed nozzles 2a and 2b are placed, on the one hand, 3a and 3b, on the other. Round the nozzle 3b a casing 4a confines in the body 1 an annular chamber 4 in which a pressure prevails set up by a fluid jet coming from the nozzle 3a and projected through a diaphragm 5 with thin walls, when the nozzles are fed, as explained hereafter.

A channel 6, bored in the body 1, allows one to measure the pressure prevailing in the chamber 4 and also to use this pressure in a receiver. The value P of this pressure forms the output signal of the detector and is contingently measurable by a manometer 4b. The nozzles 2a and 3a are connected by a duct 7a bored in the body 1 and the nozzles 2b and 3b are connected by a duct 7b bored in the body 1.

The duct 7a is supplied by a fluid source at $Pi$ pressure through a capillary restrictor 8a so that the delivery is thus made regular. The duct 7b is supplied on its side under a regular pressure $Pi'$ by the same source but through a pressure regulator 8b (FIG. 1).

Thus, a two-branch bridge mounting is produced with the four nozzles 2a, 2b, 3a, 3b, the first branch of the bridge comprising the nozzles 2a and 3a supplied by the duct 7a, the second branch of the bridge comprising the nozzles 2b and 3b supplied by the duct 7b. The nozzles 3a and 3b associated with the chamber 4, orifice 5 and channel 6, moreover form a differential fluid amplifier. Actually, in relation to the jet coming from the nozzle 3a, the diaphragm 5 forms a dynamic pressure intake, and in relation to the jet coming from the nozzle 3b, said diaphragm 5 introduces a tube effect which tends to involve the putting under depression of the chamber 4. The mean pressure value inside the chamber thus depends on the ratio of the respective delivery of the nozzles 3a and 3b at the level of the diaphragm 5.

The gap detector is so regulated that the axis of the nozzles 2a and 2b passes through the center of a small ball 9 carried by a beam 10 articulated around a spindle 11, when said beam is in an equilibrium position. The free arm of the beam 10, i.e., that opposite the ball 9, is connected to a device 12, for instance as shown in FIG. 4, being a sphere for measuring the density of a gas.

According to the position occupied by the ball 9 between the nozzles 2a and 2b, the jets coming from the nozzles 2a and 2b vary, and this also results in a modification of the gaseous flow level with the nozzles 3a and 3b, which has the effect of setting up an unbalance level with the diaphragm 5. A very slight displacement of the ball 9 thus has the effect of considerably modifying the value of the pressure inside the chamber 4, and the value P of this pressure gives an indication of the gap of the ball 9 in relation to its balanced position.

In a preferred form of embodiment of the invention, the regularly adjusted pressure $Pi'$ of the supply fluid of the nozzles 2b and 3b is selected at the rate of 10 to 15 mbar., for at this level of pressure the differential pneumatic amplifier has very great sensitiveness and very good stability. It has been ascertained that the pressure P varies in a linear manner from the zero value up to the maximal value for a pressure difference between the nozzles 3a and 3b varying from 0 to 0.015 mbar. In operation, the pressures existing in the four nozzles are consequently practically equal (to about ⅟₁₀₀₀) at any moment. The ball 9 is thus subjected by the gas jets coming from the nozzles 2a and 2b to equal quantities of movement, and the parasitic force F exerted by the ball 9 on the beam 10 of the balance is practically nil.

On the other hand, the branch of the bridge comprising the nozzles 2a and 3a being supplied through the capillary restriction 8a, the delivery in this branch is practically constant, whatever the pressure P$i$ and the position of the ball 9. When said ball 9 comes near to the nozzle 2a, the pressure in the nozzles 2a and 3a slightly increases and P considerably increases, as shown in FIG. 2 which gives the variation of the output signal P expressed in millibars as a function of the $x$ displacement of the ball 9 expressed in microns.

Experience shows that when the distance between the balls 9 and the nozzles 2a and 2b is small, (about a few hundredths of a millimetre) the variation of the output signal P as a function of the $x$ displacement shown in FIG. 2 is practically linear with a very great slope. The output scale of the detector is scanned for a displacement $x$ of $\pm 3\mu$.

FIG. 3 shows the variation of the parasitic force F exerted by the detector on the ball 9, expressed in dynes, as a function of the displacement $x$ of said ball expressed in microns. In this FIG. 3, one sees that the parasitic force F varies linearly as a function of $x$ and that it remains less than $\pm 0.5$ dyne in the measurement zone, which is an important characteristic for a force balance detector.

It goes without saying that the numerical values previously stated are given purely by way of examples and by no means limit the scope of the invention.

As shown by FIG. 4, which represents a force balance whose sphere 12 measures the Archimedean thrust exerted by a gas, the output pressure P actuates an amplifier, or delivery or power relay 14. The output of this relay 14 is connected up to a nozzle 15 of counter-reaction which delivers in the direction of a vane 16 which is attached to the spindle 11 of the beam 10. The force exerted by the jet coming from the nozzle 15 enables the equilibrium of the balance to be restored.

It is obvious that the pressure P coming from the chamber 4 can be used for controlling other mechanisms, for instance, for controlling an electro-magnetic device for restoring the equilibrium of the balance.

I claim:

1. A pneumatic gap detector for a force micrometer balance and similar devices comprising two first nozzles facing each other, a ball fixed to a member whose position gap is to be detected, this ball being placed between said two first nozzles, two second nozzles facing each other, a casing delimiting a pressure chamber surrounding one of said second nozzles and forming a pneumatic differential amplifier, the first and second nozzles being mounted in pairs like a two-branched bridge and being supplied by a same fluid source, a pressure regulator being placed between said source and that of said branches which comprises the nozzle of the amplifier, and a restrictive capillary member being placed between said source and the other branch of the bridge, and pressure detection means connected to the pressure chamber of the amplifier by which the position gap is detected.

2. A pneumatic gap detector according to claim 1, further comprising a pneumatic power amplifier connected with said pressure chamber, a power nozzle supplied by said pneumatic power amplifier, a beam of a force balance supporting said ball, and a balance restoring member actuated from said pneumatic power amplifier.

References Cited

UNITED STATES PATENTS

| | | | | |
|---|---|---|---|---|
| 2,838,927 | 6/1958 | Gray | | 73—30 |
| 3,056,293 | 10/1962 | Ofner | | 73—32UX |

LOUIS R. PRINCE, Primary Examiner

W. A. HENRY II, Assistant Examiner

U.S. Cl. X.R.

73—30